(12) United States Patent
Maehara

(10) Patent No.: US 6,260,670 B1
(45) Date of Patent: Jul. 17, 2001

(54) OPPOSED PISTON TYPE DISC BRAKE

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/544,549

(22) Filed: Apr. 6, 2000

(30) Foreign Application Priority Data

Jul. 9, 1999 (JP) .................................................. 11-102200

(51) Int. Cl.[7] .................................................. F16D 55/00
(52) U.S. Cl. ........................................ 188/73.47; 188/72.5
(58) Field of Search .............................. 188/72.5, 73.47, 188/72.1, 72.4, 73.1, 362, 364

(56) References Cited

U.S. PATENT DOCUMENTS

| | | | |
|---|---|---|---|
| 3,261,429 | * 7/1966 | Burnett et al. | 188/73.3 |
| 3,708,043 | * 1/1973 | Rath et al. | 188/73.3 |
| 4,093,043 | * 6/1978 | Smith | 188/73.6 |
| 4,494,630 | * 1/1985 | Stoka et al. | 188/71.8 |
| 4,867,280 | * 9/1989 | Von Gruenberg et al. | 188/72.4 |
| 4,890,698 | * 1/1990 | Le Deit | 188/1.11 |
| 5,515,948 | * 5/1996 | Gilliland | 188/72.5 |
| 5,538,105 | * 7/1996 | Rike | 188/73.32 |
| 5,544,724 | * 8/1996 | Kurasako | 188/72.2 |
| 5,660,253 | * 8/1997 | Rike | 188/264 G |
| 5,819,886 | * 10/1998 | Null | 188/73.41 |
| 6,000,506 | * 12/1999 | Warwick | 188/73.31 |
| 6,044,935 | * 4/2000 | Mery et al. | 188/71.5 |
| 6,164,421 | * 12/2000 | Nakamura et al. | 188/71.5 |
| 6,182,801 | * 2/2001 | Yoshida et al. | 188/73.45 |

FOREIGN PATENT DOCUMENTS

| | | |
|---|---|---|
| 1-210628 | 8/1989 | (JP) . |
| 8-277858 | 10/1996 | (JP) . |

* cited by examiner

Primary Examiner—Christopher P. Schwartz
Assistant Examiner—Benjamin A. Pezzlo
(74) Attorney, Agent, or Firm—Morgan, Lewis & Bockius LLP

(57) ABSTRACT

An opposed piston type disc brake comprising an outer body, an inner body, cylinders, pistons, and pads. A rotor rotates together with a wheel being interposed between the outer and inner bodies. The cylinders are opposed to each other and arranged in both outer and inner bodies. The pistons are fluid-tightly arranged in the cylinders and capable of being freely displaced in the axial direction of the rotor. The pads are supported by the inner and outer bodies and capable of being freely displaced in the axial direction of the rotor. The outer and inner bodies are made separately from each other. The outer body includes a main body, a connecting portion, and an attaching portion. The main body is provided with the cylinders. The connecting portion extends from both end portions of the main body in the axial direction of the rotor and straddles the rotor. The attaching portion is attached to a stationary portion of a vehicle and provided at a forward end portion of the connecting portion and towards the inner diameter side of the rotor. The inner body is connected and fixed to the attaching portion.

6 Claims, 4 Drawing Sheets

OPPOSED PISTON TYPE DISC BRAKE

BACKGROUND OF THE INVENTION

1. Field of the Invention

The present invention relates to improvements in an opposed piston type disc brake used for braking a vehicle.

2. Description of the Related Art

In order to brake a vehicle, disc brakes are commonly used. In the case of conducting braking operation by the disc brake, a pair of pads between which a rotor rotating together with a wheel is interposed are pushed against both sides of the rotor. As the disc brake described above, a floating caliper type disc brake has been conventionally used, in which a caliper having a piston is supported under the condition that the caliper can be freely displaced relative to a support member, which is fixed to a stationary portion of a vehicle, for supporting the pair of pads under the condition that the support member can be freely displaced. In the case of the above floating caliper type disc brake, the piston is arranged only on one side of the rotor, that is, the piston is arranged only on the inner face side of the rotor which becomes the central side in the width direction when the disc brake is assembled to a vehicle.

Recently, opposed piston type disc brakes have come into common use for vehicles of high performance because they can produce an excellent braking force. In the opposed piston type disc brake, there are provided pistons on both sides of a rotor. In the case of braking operation, a pair of pads are pushed against both side faces of the rotor by both the pistons. In this opposed piston type disc brake, the rotor is interposed between the cylinders, and the opening sections of the cylinders are opposed to each other. Since the opposed piston type disc brake is composed in the manner described above, while consideration is given to machining the cylinders, for example, as described in JP-A-8-277858, the body having a plurality of cylinders is divided into an inner body having an attaching portion to be attached to a stationary portion of a vehicle and also having a cylinder on the inner face side, and an outer body having a cylinder on the outer face side. After both the bodies have been machined to form the cylinders in them, they are connected and fixed to each other by bolts.

In the above conventional structure, the bolts for connecting and fixing the inner body and the outer body to each other receive brake torque which is given by the outer pad to the outer body according to the friction caused between the outer side face of the rotor and the outer pad in the process of braking operation. It is necessary for the bolts to withstand this brake torque. Therefore, the diameters of the bolts must be large, and it causes increases in the size and weight. The weight of the disc brake, which is supported at an end portion of the stationary portion of a vehicle, becomes an unsprung weight. Accordingly, even when the weight of the disc brake is increased a little, the running performance of a vehicle is affected by the increased unsprung weight. For the above reasons, it is desired to improve the circumstances.

On the other hand, in JP-A-1-210628, there is disclosed a structure in which bodies having a plurality of cylinders are integrated into one body. However, the structure described in the above patent publication is disadvantageous in that it takes time and labor to machine the cylinders and assemble the opposed piston type disc brake. Therefore, it is impossible to avoid an increase in the manufacturing cost.

SUMMARY OF THE INVENTION

The opposed piston type disc brake of the present invention has been accomplished in view of the above circumstances.

In the same manner as that of the conventional opposed piston type disc brake, the opposed piston type disc brake of the present invention comprises: an outer body; an inner body, a rotor rotating together with a wheel being interposed between the outer body and inner body; cylinders opposed to each other, arranged in both the outer and the inner body; pistons fluid-tightly arranged in the cylinders, the pistons capable of being freely displaced in the axial direction of the rotor; and pads supported by both the outer and the inner body, the pads capable of being freely displaced in the axial direction of the rotor.

Especially, in the opposed piston type disc brake of the present invention, the outer body and inner body are made separately from each other. The outer body includes: a main body provided with the cylinders; a connecting portion extending from both end portions of the main body in a direction so that the connecting portion can cross the rotor; and an attaching portion to be attached to a stationary portion of a vehicle under the condition that a forward end portion of the connecting portion is bent towards the inner diameter side of the rotor. Further, the inner body is connected and fixed to the attaching portion.

In the opposed piston type disc brake of the present invention composed as described above, the body is divided into two portions of the outer body and the inner body. Therefore, the cylinder can be easily formed in each body. Brake torque generated by the friction between the pad and the side face of the rotor in the process of braking operation is transmitted to the stationary portion of the vehicle via the outer body. Due to the above structure, the inner body bears no brake torque, and no brake torque is given to the joint section to joint the inner and outer bodies. Accordingly, it is unnecessary to excessively enhance the mechanical strength of this joint section. Therefore, the weight of the body is not excessively increased.

DETAILED DESCRIPTION OF THE PREFERRED EMBODIMENT

Figure 1:
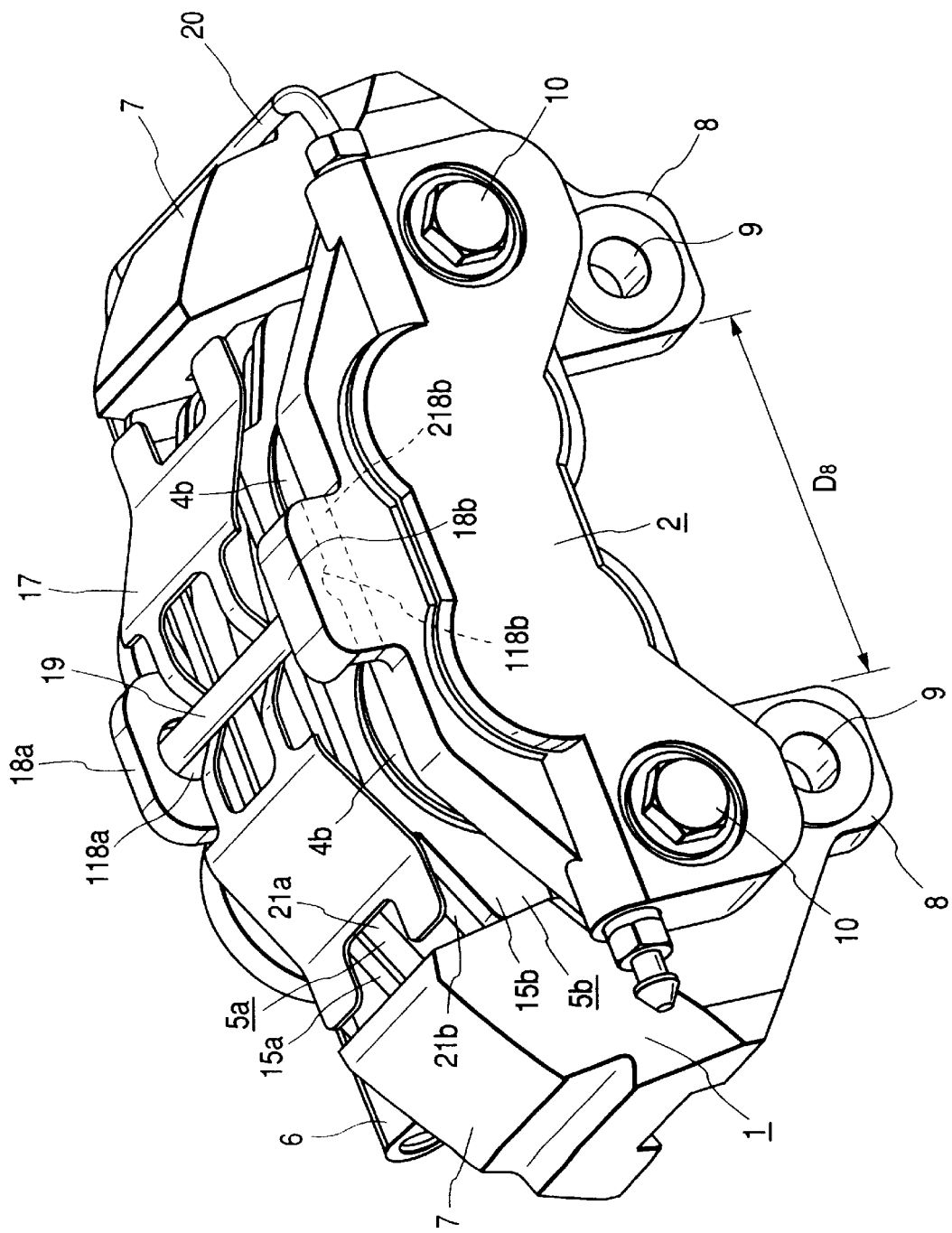
FIG. 1 is a perspective view showing an example of the embodiment of the present invention, wherein the view is taken from a portion on the inner body side a little close to the outer diameter.
Figure 2:
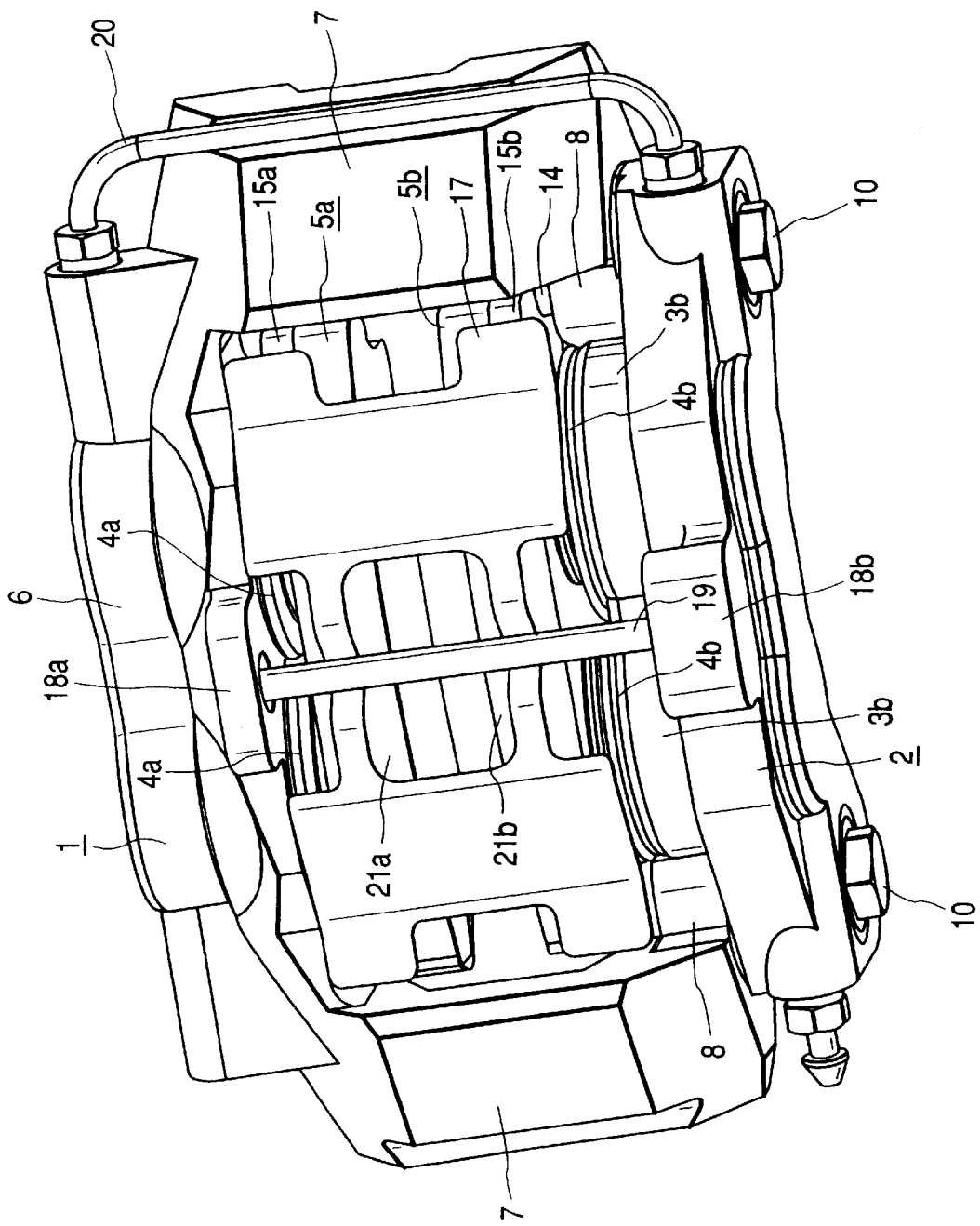
FIG. 2 is a perspective view showing an example of the embodiment of the present invention, wherein the view is taken from a portion closer to the outer diameter side.
Figure 3:
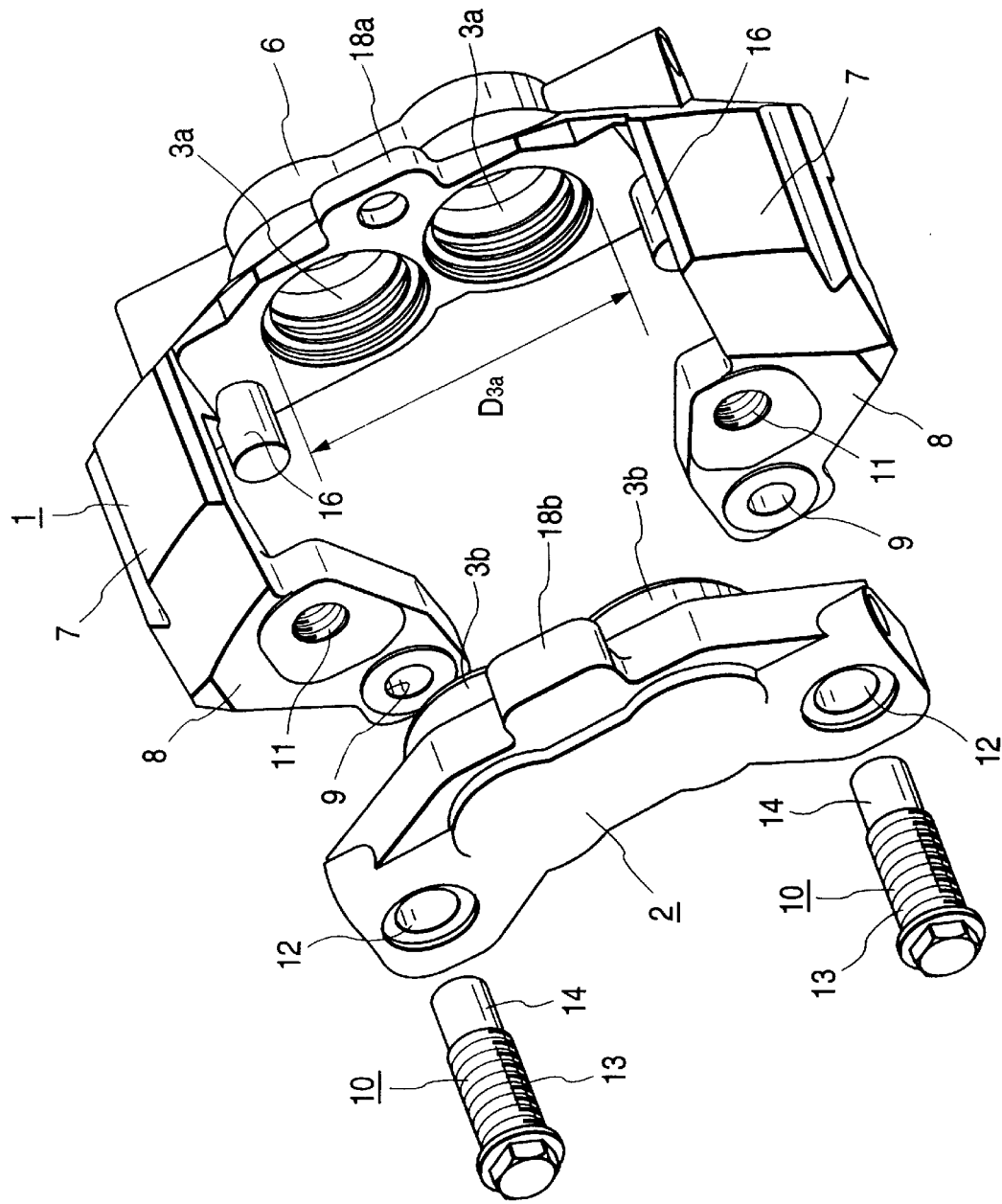
FIG. 3 is a perspective view showing an example of the embodiment of the present invention, wherein the inner body and the outer body are disassembled.
Figure 4:
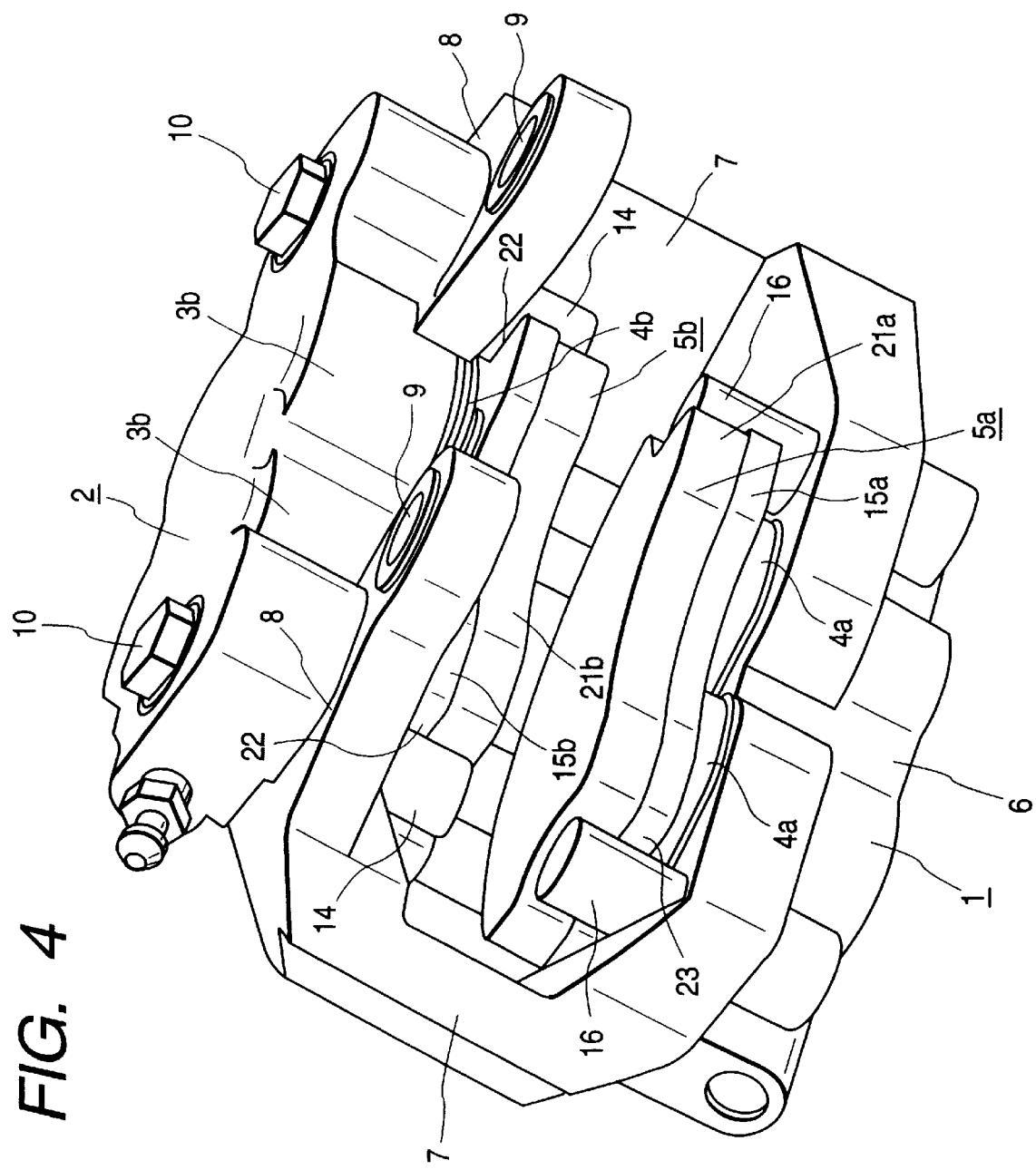
FIG. 4 is a perspective view showing an example of the embodiment of the present invention, wherein the view is taken from a portion on the inner diameter side.

FIGS. 1 to 4 are views showing an example of the embodiment of the present invention. The opposed piston type disc brake of the present invention comprises an outer body 1 and an inner body 2. A rotor, not shown in the drawing, rotated together with a wheel is interposed between both the bodies 1, 2, and the bodies 1, 2 are supported and fixed to a stationary portion of a vehicle, not shown, such as an end portion of a knuckle. In both the bodies 1, 2, there are provided four cylinders 3a, 3b in total, wherein the outer body 1 and the inner body 2 are respectively provided with two cylinders. That is, the two cylinders 3a, 3a are arranged in the outer body 1 adjacent to each other in the rotational direction of the rotor under the condition that the two cylinders 3a, 3a are open onto the inner side face of the outer body 1, that is, the two cylinders 3a, 3a are open onto the face opposed to the rotor. The two cylinders 3b, 3b are arranged in the inner body 2 under the condition that the two cylinders 3b, 3b are open onto the inner side face of the inner body 2 under the condition that the two cylinders 3b, 3b of the inner body 2 are opposed to the two cylinders 3a, 3a of the outer body 1. In these cylinders 3a, 3b, there are provided pistons 4a, 4b under the fluid-tight condition in such a manner that the pistons 4a, 4b can be freely displaced in the axial direction of the rotor. Further, in the outer body 1, there is provided a pad 5a in such a manner that the pad 5a can be freely displaced in the axial direction of the rotor.

The outer body 1 and the inner body 2 are made of cast iron or aluminum alloy by means of die-cast separately from each other. The outer body 1 includes a main body 6 in which the cylinders 3a are arranged. Concerning the rotational direction of the rotor, the connecting portions 7 are respectively protruded from both end portions of the main body 6 so that the connecting portions 7 can straddle the rotor. At the forward end portions of the connecting portions 7, there are respectively provided attaching portions 8. These attaching portions 8 are provided for attaching the outer body 1 to the knuckle. Therefore, these attaching portions 8 are formed in such a manner that the forward end portions of the connecting portions 7 are bent toward the inner diameter side of the rotor. At the forward end portions of the attaching portions 8, there are formed through-holes 9 into which the bolts, not shown, used for attaching the outer body to the knuckle are inserted. In the same manner, in the middle portion of the attaching portions 8, there are formed screw holes 11 into which the connecting bolts 10 for connecting and fixing the inner body 2 to the outer body 1 are inserted. It is preferable that distance $D_8$ (shown in FIG. 1) between the attaching portions 8 is not less than distance $D_{3a}$ between the circumferential edges on the opposite side of a pair of cylinders 3a formed in the main body 6, that is, it is preferable that $D_8 \geq D_{3a}$. In this way, the formation of the cylinders 3a is not obstructed by the attaching portions 8. However, distances $D_8$ and $D_{3a}$ are not necessarily limited to the above specific example, that is, even when distance $D_8$ is smaller than $D_{3a}$, it is possible to machine the cylinders 3a without causing any serious problem.

At both end portions of the inner body 2, there are formed through-holes 12 into which the connecting bolts 10 are inserted, wherein the pitch of the through-holes 12 is the same as that of the screw holes 11. The inner body 2 is connected and fixed to the attaching portion 8 of the outer body 1 when the connecting bolts 10 inserted into the through-holes 12 are screwed into the screw holes 11 and fastened. At the base end portions and the intermediate portions of the connecting bolts 10, 10, there are formed Male screw portions 13 which are screwed to the screw holes 11. At the forward end portions of the connecting bolts 10, there are formed columnar portions 14. The outer diameters of the columnar portions 14, 14 are smaller than the diameters of the groove bottom portions of the male screws 13.

While the inner body 2 is connected and fixed to the outer body 1 with the connecting bolts 10, the columnar portions 14 at the forward end portions of the connecting bolts 10 are protruded from the inner side faces of the attaching portions 8. These columnar portions 14 support both end portions of the pad 5b on the inner side. In order to accomplish this object, at both end portions of the back plate 15b composing the pad 5b, there are provided engaging portions 22 capable of freely engaging with the columnar portions 14. On the other hand, in order to support the pad 5a on the outer body side by the outer body 1, there are provided anchor pins 16 at both end portions of the main body 6 on the inner face side. The engaging portions 23 provided at both end portions of the back plate 15a composing the pad 5a are engaged with the anchor pins 16.

As described above, the pair of pads 5a, 5b, which are supported by the outer body 1 under the condition that the pads 5a, 5b can be freely displaced in the axial direction of the rotor, are elastically suppressed by the pad spring 17. Therefore, the pads can be prevented from rattling when the vehicle is running. For this structure, protruding pieces 18a, 18b are arranged at the centers of the outer circumferential edges of the outer body 1 and the inner body 2, and a holding pin 19 is arranged between both the protruding pieces 18a, 18b. On the surface of the protruding piece 18a, there is provided a hollow 118a. On the other hand, on the surface of the protruding piece 18b, there are provided a hollow 118b and a groove 218b. The hollow 118b is opposite the hollow 118a of the protruding piece 18a and provided on the groove 218b. In order to arrange the holding pin 19 between both the protruding pieces 18a, 18b, first, one end of the holding pin 19 is hooked onto the hollow 118a of the protruding piece 18a. Next, the other end of the holding pin 19 is inserted into the groove 218b of the protruding piece 18b from one end of the groove 218b. Then the other end of the holding pin 19 is moved and hooked onto the hollow 118a. Due to this construction of the present invention, a stopper such as a screw or a cotter pin is not necessary to hold the holding pin 19. The inner circumferential faces at both end portions of the pad spring 17, which is composed of an elastic sheet member made of spring steel such as stainless steel, come into contact with the back plates 15a, 15b of the pads 5a, 5b under the condition that the outer circumferential face at the center of the pad spring 17 is held by the holding pin 19.

The cylinders 3a provided in the outer body 1 and the cylinders 3b provided in the inner body 2 are communicated with each other by a tube 20. Further, the cylinders 3a provided in the outer body 1 are communicated with each other by a fluid path formed in the outer body 1, and the cylinders 3b provided in the inner body 2 are communicated with each other by a fluid path formed in the inner body 2. Accordingly, when hydraulic fluid is supplied into or discharged from one of the cylinders 3b provided in the inner body 2 via a supply and discharge port (not shown) formed in the inner body 2, hydraulic fluid can be supplied into or discharged from all the cylinders 3a, 3b.

When braking operation is conducted by the above opposed piston type disc brake of the present invention, hydraulic fluid is supplied into the cylinders 3a, 3b via the supply and discharge port, fluid path and tube 20. As a result, the pistons 4a, 4b arranged in the cylinders 3a, 3b push the pads 5a, 5b against both the side faces of the rotor. By the friction between the friction linings 21a, 21b of the pads 5a, 5b and both the side faces of the rotor, braking operation can be conducted. Brake torque given to the pads 5a, 5b by the friction in the process of braking operation is transmitted to the outer body 1 via any anchor pin 16, which is located ahead in the rotational direction, and also via any connecting bolt 10, so that the torque is born by the knuckle.

In the opposed piston type disc brake of the present invention composed as described above, the body is divided into two portions of the outer body 1 and the inner body 2. Therefore, the cylinders 3a, 3b can be easily formed in the bodies 1, 2. That is, the opening of each cylinder 3a, 3b is not covered with other components, in other words, the opening of each cylinder 3a, 3b is widely open. Accordingly, the bodies 1, 2 can be easily cast, and the inner circumferential faces of the cylinders 3a, 3b can be easily machined for finishing process.

Brake torque generated by the friction between the pads 5a, 5b and both the side faces of the rotor is transmitted to the knuckle via the outer body 1. Therefore, the brake torque is given to neither the inner body 2 nor the connecting portion of the inner body 2 with the outer body 1. That is, the brake torque given to the columnar portion 14 of the connecting bolts 10 existing ahead in the rotational direction is held by the attaching portion 8 of the outer body 1, and the brake torque is not transmitted to the inner body 2. An amount of protrusion of the columnar portion 14 from the attaching portion 8 is small; therefore, even when the outer diameter of the columnar portion 14 is not so large, the brake torque can be sufficiently held by the columnar portion. Consequently, it is unnecessary to excessively increase the outer diameters of the connecting bolts 10. Since the brake torque can be held by the connecting bolts of small diameter, the body weight is not increased.

Since the present invention is composed and operated as described above, it is possible to realize a light and inexpensive opposed piston type disc brake.

While only a certain embodiment of the invention has been specifically described herein, it will be apparent that numerous modifications may be made thereto without departing from the spirit and scope of the invention.

The present invention is based on Japanese Patent Application No. Hei. 11-102200 which is incorporated herein by reference.

What is claimed is:

1. An opposed piston type disc brake comprising:
    an outer body;
    an inner body, a rotor rotating together with a wheel being interposed between said outer and inner bodies;
    cylinders opposed to each other and arranged in both said outer and inner bodies;
    pistons fluid-tightly arranged in said cylinders and capable of being freely displaced in the axial direction of the rotor; and
    pads supported by said inner and outer bodies and capable of being freely displaced in the axial direction of the rotor,
    wherein said outer and inner bodies are made separately from each other, and said outer body includes:
        a main body provided with said cylinders;
        a connecting portion extending from both end portions of the main body in the axial direction of the rotor and straddling the rotor; and
        an attaching portion attached to a stationary portion of a vehicle and provided at a forward end portion of the connecting portion and towards the inner diameter side of the rotor, and
    wherein the inner body is connected and fixed to the attaching portion.

2. The opposed piston type disc brake according to claim 1, further comprising at least one pair of bolts connecting and fixing both end portions of the inner body to the attaching portion of said outer body.

3. The opposed piston type disc brake according to claim 2, wherein said bolt includes a columnar portion arranged at the forward end portions of said bolts connecting and fixing the end portion of said inner body to the attaching portion, the columnar portion protruded to the inner face side of the rotor compared with the attaching portion and bearing said pad on the inner side.

4. The opposed piston type disc brake according to claim 1, wherein a first distance between the attaching portions of said outer body is not less than a second distance between the circumferential edges on the opposite side of a pair of said cylinders formed in the main body of said outer body.

5. The opposed piston type disc brake according to claim 1, further comprising:
    a pad spring suppressing said pads; and
    a holding pin holding said pad spring,
    wherein said outer body includes a first protruding piece at the center of the outer circumferential edge, and said inner body includes a second protruding piece at the center of the outer circumferential edge, and the first and second protruding pieces support said holding pin.

6. The opposed piston type disc brake according to claim 5, wherein said outer body includes a first hollow on a surface of the first protruding piece, and said inner body includes a second hollow and a groove on a surface of the second protruding piece.

* * * * *